(12) United States Patent
Wehmann et al.

(10) Patent No.: US 8,230,089 B2
(45) Date of Patent: Jul. 24, 2012

(54) ON-SITE DYNAMIC PERSONALIZATION SYSTEM AND METHOD

(75) Inventors: James M. Wehmann, Independence, MN (US); Mary Suddendorf Braunwarth, Chanhassen, MN (US); Charles W. Bounce, Minneapolis, MN (US)

(73) Assignee: Digital River, Inc., Minnetonka, MN (US)

( * ) Notice: Subject to any disclaimer, the term of this patent is extended or adjusted under 35 U.S.C. 154(b) by 217 days.

(21) Appl. No.: 12/731,976

(22) Filed: Mar. 25, 2010

(65) Prior Publication Data

US 2010/0250714 A1  Sep. 30, 2010

Related U.S. Application Data

(60) Provisional application No. 61/163,212, filed on Mar. 25, 2009.

(51) Int. Cl.
*G06F 15/16* (2006.01)
*G06Q 30/00* (2012.01)

(52) U.S. Cl. ............ 709/229; 709/203; 705/14.43; 705/14.49; 705/26.42

(58) Field of Classification Search ............ None
See application file for complete search history.

(56) References Cited

U.S. PATENT DOCUMENTS

| | | | |
|---|---|---|---|
| 6,915,271 B1 * | 7/2005 | Meyer et al. | 705/14.35 |
| 7,013,290 B2 * | 3/2006 | Ananian | 705/26.42 |
| 7,313,622 B2 | 12/2007 | Lee et al. | |
| 7,991,764 B2 * | 8/2011 | Rathod | 707/713 |
| 2007/0239535 A1 | 10/2007 | Koran et al. | |
| 2008/0097832 A1 | 4/2008 | Lee et al. | |
| 2008/0147480 A1 * | 6/2008 | Sarma et al. | 705/10 |
| 2008/0221987 A1 * | 9/2008 | Sundaresan et al. | 705/14 |
| 2009/0006363 A1 | 1/2009 | Canny et al. | |
| 2010/0030578 A1 * | 2/2010 | Siddique et al. | 705/3 |

* cited by examiner

*Primary Examiner* — Wen-Tai Lin
(74) *Attorney, Agent, or Firm* — Clise, Billion & Cyr, P.A.; Lynn M. Holly; Shawn B. Dempster

(57) ABSTRACT

An on-site dynamic personalization system and method having a browser interacting through an internet connection with web pages of members in a cooperative network is described. The system includes a processor coupled through the internet connection to the browser. In addition, the system includes a memory with a cooperative membership database that stores data collected as the browser navigates web pages in the cooperative network. The memory also includes a software module with program code that the processor executes to cause the system to perform certain operations. These operations include: collecting data in the form of universal resource locators as the browser navigates web pages, storing the collected data and assimilating the data by aggregating the stored data, analyzing the assimilated data to determine user preferences based on identification of particular web pages with content viewed by the browser, and dynamically inserting personalized content from a particular member in the cooperative network into a web page associated with the particular member to create a personalized web page. This personalized content is based on the determined user preferences for the browser.

13 Claims, 4 Drawing Sheets

HTTPS Protocol Tag ← 402

```
<SCRIPT src="https://s.xp1.ru4.com/
meta?_o=41519&_t=dns&ssv_client=INSERT_VALUE&ssv_site_ID=INSERT_VALUE
&ssv_language_locale=INSERT_VALUE&ssv_page_type=INSERT_VALUE&ssv_prod
uct_name_1=INSERT_VALUE&ssv_product_unit_price_1=INSERT_VALUE&ssv_pro
duct_name_2=INSERT_VALUE&ssv_product_unit_price_2=INSERT_VALUE&ssv_pr
oduct_type_purchased=INSERT_VALUE&ssv_product_eds_purchased=INSERT_VA
LUE&ssv_product_cd_purchased=INSERT_VALUE&ssv_total_order_amount=INSE
RT_VALUE&ssv_order_currency=INSERT_VALUE&ssv_url=INSERT_VALUE"></
SCRIPT>
```

FIG. 4

FIG. 5

ON-SITE DYNAMIC PERSONALIZATION
SYSTEM AND METHOD

This application claims the benefit of U.S. Provisional Application No. 61/163,212 filed 25 Mar. 2009, entitled "Integrated Behavioral Targeting System and Method," which is incorporated herein by reference.

FIELD OF THE INVENTION

The present invention relates to electronic commerce systems for use on the internet. More particularly, the present invention relates to tools for enabling the dynamic targeting of web site users based on internet user behavior.

BACKGROUND OF THE INVENTION

E-commerce merchants have a wide range of product offerings across a diverse set of customer genres. When users enter an e-commerce website experience, there is a limited opportunity to select among these offerings or advertisements to present relevant content that will ultimately lead to a product purchase. Typically, there is a very limited amount of information that is available to the site customization process regarding the interests and actions that have led the user to enter the particular e-commerce website. Behavioral targeting seeks to understand the user in order to provide the most relevant offering with the goal of gaining and retaining customers.

Behavioral targeting generally involves the collection of information about a web user or consumer's online activities in order to deliver advertising targeted to potential purchases. By observing the web activities of millions of consumers, advertising networks may closely match the consumer with relevant advertising. This observation generally involves the collection and analysis of click stream and other online user behavior to create a score or profile that, as accurately as possible, identifies the consumer as a person who may be interested in certain products or content. Collection of data typically involves the tagging of web sites in order to track and capture click stream data as the consumer browses a web site. Data may be collected and stored in a database or data warehouse and is subjected to data mining algorithms to uncover patterns in browser behavior. The results of the data mining procedure is used to create the behavioral profile or score which may then be used to serve targeted ads matched to the user's profile.

While this process works well for creating advertising, such as banner ads, on third party sites, advertising drives a only a small percentage of revenue. A system and method is needed that will increase the likelihood of actually making a purchase when the customer or shopper is on a store web site. The present invention provides such a system and offers other advantages over the prior art.

BRIEF SUMMARY OF THE INVENTION

To support various business models, the practice of gathering and sharing anonymous click-stream data about an individual browser has become very common. For example, display advertising networks offer behavioral targeting of display ads by leveraging co-operative networks of data. Tracked purchase history and click stream data of browsers can provide the merchant with additional insight into consumer characteristics and preferences based on their behavior. The analysis and modeling of this browser-based data is then used to create shopper/user profiles which are then referenced dynamically when the shopper is on-site to dynamically change the web page content for the web site or navigation of the web site presented to the shopper through the browser.

This information gathering and sharing process can be applied to develop a unique view of consumer/shopper browser behavior. Furthermore, it can be extended to co-operatively share consumer/shopper browsing behaviors and responses to various forms of campaigning driven by optimization processes such as Multivariate Testing (MVT) and decisioning processes such as Dynamic Personalization (DP). The MVT and DP processes are applied to the continuous marketing dialogue and individual marketing decisions within a site and outside of the site to provide an optimized engagement and shopping experience provided through the browser that is focused on driving ecommerce purchases. For example, if a consumer/shopper browser, based on a co-operative view of the browsing behavior, is shown to respond more positively to a price sensitive offer, this knowledge can be utilized to enable more relevant campaigning processes to drive sales on sharing e-commerce sites.

While sharing provides a number of benefits to the web site merchant, it may also be desirable to opt out of participating in the shared resource. For instance, two merchants in direct competition may not want to share their information. In that case, a merchant may be blocked from the shared experience stored in the co-operative membership database. This allows each of the merchants to participate in the overall co-operative membership database without compromising key competitive intelligence.

Additional advantages and features of the invention will be set forth in part in the description which follows, and in part, will become apparent to those skilled in the art upon examination of the following or may be learned by practice of the invention.

BRIEF DESCRIPTION OF THE DRAWINGS

FIG. 4 is an exemplary tag placed on a member web site.

FIG. 5 illustrates an on-site dynamically personalized web site experience for a browser shown to respond to promotional offers.

DETAILED DESCRIPTION

Figure 1:
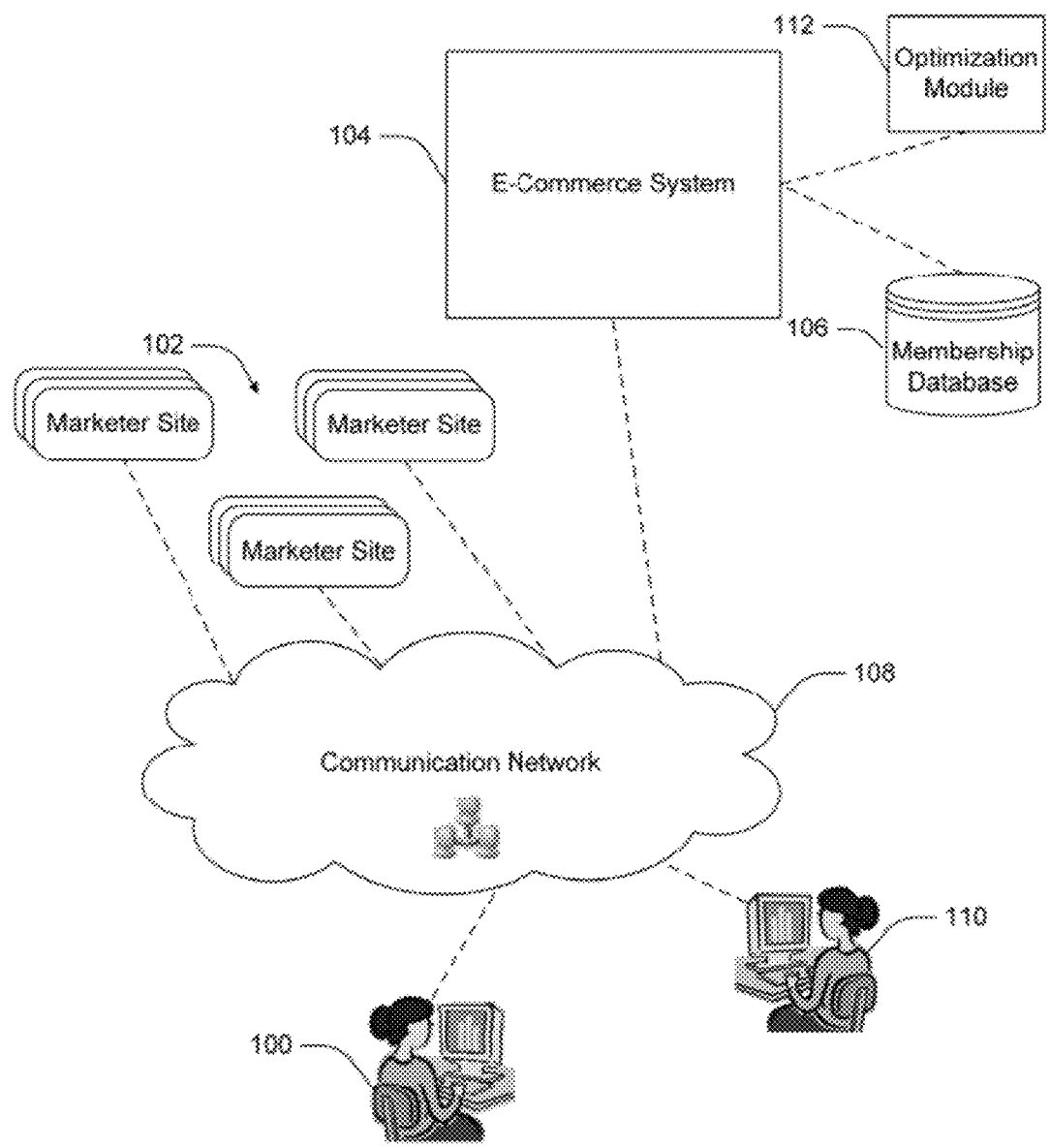
FIG. 1 is a context diagram illustrating the components of the system.

A preferred embodiment of a cooperative dynamic personalization system contemplates a membership-based data network of internet merchants from whose web-sites and web stores data may be collected. An exemplary system is illustrated in FIG. 1. The system might include any type of provider web site(s) 102 with items to sell or distribute, possibly hosted on a web server, and connected with an e-commerce system 104 via the Internet 108. The exemplary data processing system includes various computers or computing devices, including end user machines 100, 110, web site servers 102, an e-commerce system or platform 104 hosted on one or more servers (computing devices) and a cooperative database 106. Each computer or computing device is connected with a network 108 such as the Internet or other type of data network. The computer or computing device typically includes a memory, a secondary storage device, a processor (central processing unit, or CPU), an input device, a display device, and an output device. The memory may include random access memory (RAM) or similar types of memory.

Software applications, stored in the memory or secondary storage for execution by a processor are operatively configured to perform the operations of the exemplary system. The software applications may correspond with a single module or any number of modules which are program code or instructions for controlling a computer processor to perform a particular method. The modules preferably implement the features or operations of the system. The modules may also be implemented using program products or a combination of software and specialized hardware components. In addition, the modules may be executed on multiple processors for processing a large number of transactions, if necessary or desired.

The secondary storage device may include a hard disk drive, floppy disk drive, CD-ROM drive, DVD-ROM drive, or other types of non-volatile data storage, and it may correspond with the various databases shown in the figures. The processor may execute the software applications or programs either stored in memory or secondary storage or received from the Internet or other network. The input device may include any device for entering information into computer, such as a keyboard, cursor-control device, or touch-screen. The display device may include any type of device for presenting visual information such as, for example, a computer monitor or flat-screen display. The output device may include any type of device for presenting a hard copy of information, such as a printer, and other types of output devices include speakers or any device for providing information in audio form.

Although the computer or computing device has been described with various components, one skilled in the art will appreciate that such a computer can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. Computing devices may be either client or server computers. Client computers (e.g. 100 and 110) are those computers used by end users to access information from a server over a network, such as the Internet 108. Servers are understood to be those computing devices that provide services to other machines, and may be (but are not required to be) dedicated to hosting applications or content to be accessed by any number of client computers.

The e-commerce system 104, or platform, provides various purchase and fulfillment functionality through modules which may include: a configuration module or console, such as a graphical user interface (GUI) or data management tools (i.e. data loader, etc) to configure and maintain qualification and restriction requirements; a catalog or presentation module to display items available for sale or distribution to users; an account management module to create user accounts; a shopping cart module to collect the user's selected items; an order processing module to complete the sale and perform billing and payment operations; a fulfillment module to maintain product locations or products for download or interface with warehouse systems for physical fulfillment; and an e-mail module to forward account and distribution instructions and links to users. An e-commerce system 104 may be hosted by an Application Service Provider (ASP) or on the merchant's own web site 102.

The e-commerce system may include an optimization module 112. Such an optimization module allows web merchants to test various web page configurations and content in order to determine the combination that provides the greatest lift in sales for a particular marketing campaign. The optimization module 112 may also be used with the cooperative membership database 106 to model profiles for targeted advertising, landing page optimization, site navigation optimization and segmented offers. The description of such a system and modules is intended to be illustrative and in no way limiting. One skilled in the art would appreciate that other modules and functions may be provided, depending on business requirements.

An on-site dynamic personalization system and method derives much of its value from data sharing among the members of a cooperative membership network. Based on agreement of the various web site owners from where the data is gathered, the data can be analyzed and leveraged in a shared manner across records with the aligned web site attribute values. This allows a more comprehensive view of a particular browser's activity. The sharing of data can be bound by defined business rules if desired, in order to limit access to competition. For example, a web site selling office productivity software may be concerned about the site activity leading to a tailored offer on another site that sells competing office productivity software. Web site merchants may opt out of participating in shared data resources, and can be blocked to ensure that their data are not accessed by others. The data sharing options may be defined through the analytical and access processes defined on behalf of individual clients and groups of clients, if possible (i.e. they all have the same data sharing agreement parameters). Generally, online merchants, especially those in the same retail market, find value in obtaining data on the market share that is captured by their competitors and sharing, especially of anonymous click-stream data, is usually not a problem.

Figure 2:
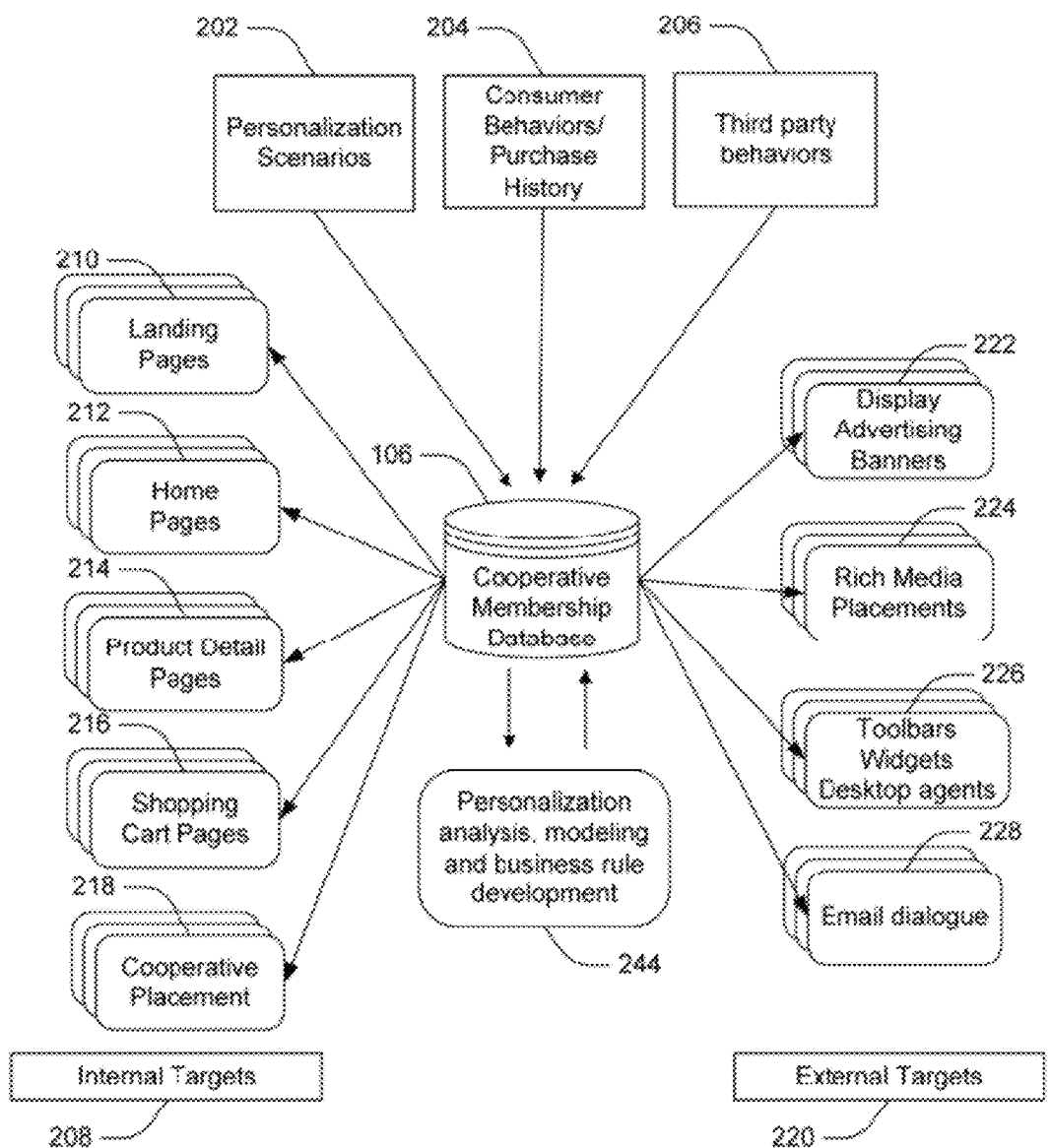
FIG. 2 illustrates some of the possibilities for the input and output of a cooperative behavioral targeting system and method.

The operation of a preferred embodiment of an on-site dynamic personalization system is illustrated in FIG. 2. An on-site dynamic personalization system identifies the behaviors of internet users in several ways. Personalization scenarios 202 are created as a result of web site and marketing campaign optimization techniques, such as MVT testing, site tests and test tracking. Consumer behaviors and purchase history 204 include tracking the users' browsing patterns, gathering click-stream behavior, search engine queries and providing member site ecommerce tracked purchase history. Third party behavioral data or demographics 206 may be obtained by accessing other cooperative networks based on such information as zip code (obtained from the browser's IP address). Data from these sources is collected and stored in a database 106 and translated through various processes into a common definition set of the pages, products or features that caught the interest of the user. The data is analyzed to develop decision logic and model scores that can be applied when interacting with the browser. A dynamic personalization interface 244 stores business rules and other logic to be applied to the data at the interaction moment to determine which variant of a number of presentation features may meet a particular goal or target and present the most appropriate information to the user/consumer/shopper through the browser. The modeling results may be applied internally, to landing web pages 210, home web pages 212, product detail web pages 214, shopping cart web pages 216 and other cooperative placements 218. The results may also be applied to external targets, such as display banner advertising 222, rich media content 224, widgets and toolbars 226, e-mail content 228 and more to the user.

An example serves to highlight the benefits of an on-site dynamic personalization system. A cooperative data network may consist of 20 participating web merchants (or members). These web sites are specifically identified with tags (see FIG. 4) so that when a user's browser enters the participating site 302, the system looks for an identifying cookie 304 in the browser; if it doesn't find one, the system will place one on the user's machine 306 associated with the browser. If an identifying cookie is found, the data is extracted 310 and added to the cooperative membership database where it will be assimilated, analyzed and tested 312 and included in the algorithm for creating user profiles. Generally, data is collected for a period of time (e.g. 60 days) before updating occurs. This allows the system to create more accurate profiles by using a substantial amount of data. Once the system has created the profile, when the cookie is found by the browser on the user's machine, it will be updated 308 with user profile information. The next time the user enters a member site and the cookie is read by the browser, the on-site dynamic personalization 314 system uses the updated profile indicator to determine the content of the information presented to the user. The behavior of the user when presented with the dynamic content delivery is then tracked and looped back into data collection 316.

While the sources of profile modeling data may be complex, some simple examples illustrate the system and method. For example, a shopper on client #1's web site through the browser responds to an upsell offer for a product or service. Subsequently, when the same shopper (i.e., the web browser associated with that shopper) makes a purchase on client #2's website, an upsell interstitial offer for a product or server may be dynamically presented in a personalized web page along with whatever is typically presented to the shopper in web pages for completing the transaction. Similarly, if a shopper enters a price sensitive keyword into a web page search engine and lands on a web page on client #3's web site, then subsequently navigates to a web page on client #4's web site, the prices of items on the client #4's web pages may be dynamically discounted because this shopper has been identified as a price sensitive shopper. Alternatively, if a shopper declines a cross-sell interstitial offer on a web page on client #5's web site, then when the customer is on a web page on client #6's online store the interstitial cross-sells are dynamically turned off for that customer (i.e., not included in the personalized web pages delivered to the web browser for that shopper). In addition, a shopper may complete a purchase for a premium product on client #1's web site, and then navigate to web pages of client #7's online store. The shopper's profile indicates that this person has purchased a particular product (e.g., a laptop computer) and a complementary product (e.g., carrying case for the laptop computer) is offered to the shopper on a web page from client #7's online store.

System Components

Figure 3:
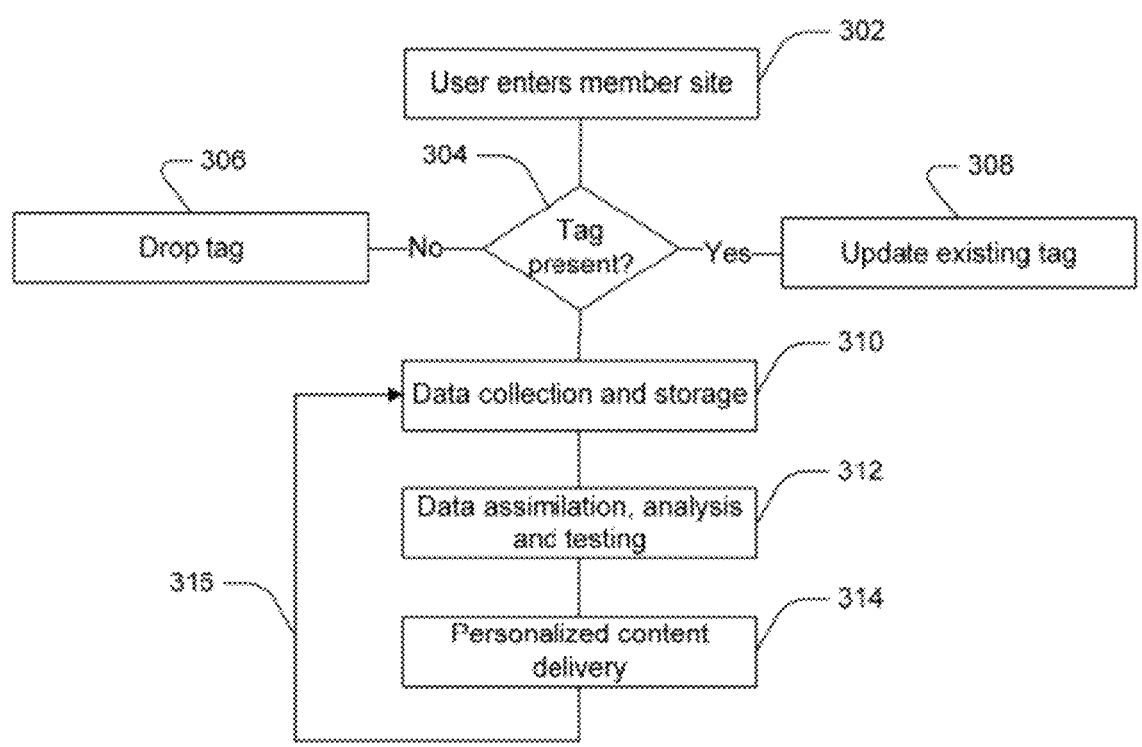
FIG. 3 illustrates the process of setting up cooperative data sharing.

As was illustrated in FIGS. 1 through 3, the system consists of various modules that perform data collection and storage 310, data assimilation, analysis and testing 312, and personalized content delivery 314 functions. These modules consist of programs in physical memory located on a computing device, generally a server, operatively connected to the e-commerce system 104, optimization module 112 and cooperative membership database 106 shown in FIG. 1.

Data Collection and Storage

Data collection tags are placed on all member web site web pages 102, landing web pages and microsites. An exemplary tag is shown in FIG. 4. These data collection tags gather a series of name value pairs of relevant data from the page as it is viewed by the user. The relevant data includes client, site, page type, product(s) presented, product offer/purchase details, and is typically format as a universal resource locator (URL). This data collection tag will trigger at the point of page access.

Many companies that allow their site activity data to be gathered and shared are also interested in further monetizing their data. These third party 206 sites can cover a wide span of content, from media to e-commerce. This data can be acquired, for instance, by making a javascript call, and integrated with the data in the cooperative membership database. In such a data acquisition case, the on-site dynamic personalization system gains access to other data gathering and sharing networks through various bartering relationships and a technical integration at the cookie level.

Data is stored in a data network cooperative membership database 106. The data model includes raw data attributes as well as attributes of summary, aggregation and commonality. The commonality attributes tie to a common product definition taxonomy that allows for synchronization across many product taxonomies with varying customized definitions. This allows similar, but disparately named web site data to be collected in a common and appropriately labeled field. The summary, aggregate and common attributes are processed based on business rules during the Extract, Transformation, Load (ETL) processes that load the data in to the database. An appropriate amount of detail must be gathered to enable the Data Assimilation process to clearly define and delineate the gathered data. For example, the product IDs of products being viewed must be captured to allow later categorization through access to the product catalogue taxonomy.

Web page visit data may be collected anonymously in that it collects no personally identifiable information (PII) such as an IP address, but relates only to a cookie identifier. The system collects click-stream history, mainly in the form of universal resource locators (URLs) for site visits. In addition to click-stream data, the quality of an internet marketing decision is greatly enhanced by the addition of tracked e-commerce purchase history data and any associated profile information collected at the time of purchase. To enhance the statistical accuracy and efficacy of the data, a minimum number of records may want to be collected prior to performing analytics. For example, a merchant may wish to have 60 days of data before applying it to creating end user profiles.

Data Assimilation, Analysis and Testing

Once the data is gathered, it is subjected to predictive modeling processes to translate, consolidate, aggregate and summarize the data to allow meaningful analysis. This allows the raw, highly detailed data to be viewed as a comprehensive profile of a browser in terms of the types, recentness and frequencies of browsing behavior. This process may require integration with other information sources such as a product catalog taxonomy, for example.

Once the data is prepared, it is analyzed for future decision making through a variety of business intelligence and analytical methods. The system looks for patterns of behavior, builds model algorithm scores that predict future behavior based on the historical behavior of similar people and makes the data amenable to decision making. Examples include defining characteristics such as the propensity to upgrade or the propensity to be willing to pay full price for a particular item.

The results of these analyses vary from simple business rules to complex model algorithms that score the relative likelihood of a future action based on historical behavior. Decisions are executed by a dynamic personalization interface 244, 316, which looks at the browser history and model scores to drive a decision to present a particular dialogue, offer or experience to the consumer/shopper.

Once all of the necessary attributes are available, testing allows the merchant to look at what is known about a user/consumer/shopper to determine which of many variations is the best scenario for the merchant's goal for a particular marketing situation (i.e. site optimization, e-mail, display advertising, etc.). For example, in a web site optimization situation, the merchant may want to determine the most relevant price, product presentation, object location on the page, security emphasis, or value proposition. MVT provides statistically relevant projections on a large number of potential combinations and predicts what the best possible combination is for a particular incoming profile.

Once the merchant has determined a testing approach, the business rules parameters of the approach are entered into the applicable business rule interface depending on the marketing channel. These interfaces could include a dynamic site personalization tool, or alternatively, a display advertising portal, an e-mail interface set-up screen or others.

Once the data has been analyzed, it is applied to the browser interaction process in a testing process to determine the best possible experience in terms of content, content placement, site navigation and more. The results of this testing is a particular set of decisions that will be applied to the interaction for ongoing execution.

Personalized Content Delivery

When the model behavior scores and user profiles have been developed, they may be associated with a personalization scenario based on web site optimization testing; multivariate (MVT) or A/B testing, for example. When the user/consumer/shopper through a browser makes a subsequent visit to a member site, the browser cookie will be read and updated with a profile/personalization identifier. This identifier allows the merchant to display in the browser, as shown in FIG. 2, the most appropriate marketing content to the shopper or user based on his or her own behavior, tracked purchase history and an optimal presentation strategy. Marketing content may include, for example, a campaign offering, a click-through banner ad or a discount coupon selected as relevant for the user's profile.

FIG. 5 is an example of a dynamically personalized web page experience 502. A browser identified as navigating member sites that has also been shown to be a price sensitive shopper, may be offered a promotional offer 504 with a price strike through discount offer on the home page of the next member site that the user visits. The results of this web site interaction is then tracked and looped back into the Data Assimilation, Analysis and Testing processes to further optimize the interaction application.

Additional Applications

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application of the on-site dynamic personalization system that are organized or designed differently while maintaining substantially the same functionality without departing from the scope and spirit of the present invention.

What is claimed is:

1. A computer-implemented dynamic web page personalization method involving a web page browser interacting through an internet connection with web pages associated with web merchant members in a cooperative network, comprising:

collecting data in the form of universal resource locators as the browser navigates specifically identified web pages in the cooperative network;

storing the collected data in a cooperative membership database;

assimilating the stored data by transforming commonality attributes to tie product information to a common product definition taxonomy that allows for synchronization across many product taxonomies with varying customized definitions, summarizing and aggregating the stored data to allow for analysis;

analyzing the assimilated data to determine user preferences based on identification of particular web pages with content that was viewed by the browser and according to business rules defined in part by cooperative network member agreements established among web merchant members forming the cooperative network; and dynamically inserting personalized content from a particular member in the cooperative network into a web page associated with the particular member to create a personalized web page for delivery to the browser, the personalized content being selected for the personalized web page based on the determined user preferences for the browser and optimized based on statistical testing results, wherein the dynamically inserting step further comprises optimizing the personalized web page based on statistical testing results.

2. The dynamic web page personalization method of claim 1 further comprising a step of checking the browser for an identifying cookie and installing the identifying cookie when the identifying cookie was not found in the browser.

3. The dynamic web page personalization method of claim 1 wherein the collecting step further comprises collecting user preference data from a third party data network.

4. The dynamic web page personalization method of claim 1 wherein:

the storing step further comprises storing tracked purchase event data associated with the browser in the cooperative membership database;

the dynamically inserting step further comprises selecting personalized content from the particular member in the cooperative network based on the tracked purchase event for the browser.

5. The dynamic web page personalization method of claim 1 wherein the dynamically inserting step further comprises optimizing the personalized web page based on information from a multi-variate testing system.

6. The dynamic web page personalization method of claim 1 wherein the dynamically inserting step further comprises optimizing the personalized web page based on information from an A/B testing system.

7. A dynamic web page personalization system for providing a personalized web page to internet browsers interacting through an internet connection with web pages associated with members in a cooperative network, the system comprising:
- a processor;
- an internet connection operatively coupled to a web page browser and the processor;
  - a memory comprising a web merchant cooperative membership database that is configured to store data collected in the form of universal resource locators as the browser navigates specifically identified web pages in the cooperative network, the memory further comprising a software module containing program code which when executed by the processor in the system causes the system to perform operations of dynamic web page personalization, the operations comprising:
  - collecting data in the form of universal resource locators through the internet connection as the browser navigates specifically identified web pages in the cooperative network;
  - storing the collected data in the cooperative membership database in the memory;
  - assimilating the stored data in the memory by processing incoming data against commonality attributes to tie to a common product definition taxonomy that allows for synchronization across many product taxonomies with varying customized definitions, summarizing and aggregating the stored data to allow for analysis;
  - analyzing the assimilated data in the memory to determine user preferences based on identification of particular web pages with content that was viewed by the browser and according to business rules defined in part by web merchant cooperative network member agreements established among web merchant members forming the cooperative network; and
  - dynamically inserting personalized content from a particular member in the cooperative network into a web page associated with the particular member to create a personalized web page for delivery to the browser, the personalized content being selected for the personalized web page based on the determined user preferences for the browser and optimized based on statistical testing results; and
- where the processor executes the program code in the software module in the memory to perform the steps of dynamic web page personalization such that the personalized web page for delivery to the browser is created.

8. The dynamic web page personalization system of claim 7 wherein the software module further comprises program code which when executed by the processor in the system causes the system to check the browser for an identifying cookie and install the identifying cookie when the identifying cookie was not found in the browser.

9. The dynamic web page personalization system of claim 7 wherein the software module further comprises program code which when executed by the processor in the system causes the system to collect user preference data from a third party data network.

10. The dynamic web page personalization system of claim 7 wherein the software module further comprises program code which when executed by the processor in the system causes the system to: (i) track purchase event data associated with the browser in the cooperative membership database in the memory; and (ii) to select personalized content from the particular member in the cooperative network based on the tracked purchase event for the browser.

11. The dynamic web page personalization system of claim 7 wherein the software module further comprises program code which when executed by the processor in the system causes the system to optimize the personalized web page based on information from a multi-variate testing system.

12. The dynamic web page personalization system of claim 7 wherein the software module further comprises program code which when executed by the processor in the system causes the system to optimize the personalized web page based on information from an A/B testing system.

13. A computer-implemented dynamic web page personalization method involving a web page browser interacting through an internet connection with web pages associated with web merchant members in a cooperative network, comprising:
- collecting data in the form of universal resource locators as the browser navigates specifically identified web pages in the cooperative network;
- storing the collected data in a cooperative membership database;
- assimilating the stored data by aggregating the stored data to allow for analysis;
- analyzing the assimilated data to determine user preferences based on identification of particular web pages with content that was viewed by the browser and according to business rules defined in part by web merchant cooperative network member agreements established among the web merchant members of the cooperative network; and
- dynamically inserting personalized content from a particular member in the cooperative network into a web page associated with the particular member to create a personalized web page for delivery to the browser, the personalized content being selected for the personalized web page based on the determined user preferences for the browser and optimized based on information from a multi-variate testing system or from an A/B testing system.

* * * * *